(12) United States Patent
Ohlsson

(10) Patent No.: US 6,857,664 B2
(45) Date of Patent: Feb. 22, 2005

(54) MOUNTING STOP

(75) Inventor: Weimar Ohlsson, Surte (SE)

(73) Assignee: WEO Hydraulic AB, Surte (SE)

( * ) Notice: Subject to any disclaimer, the term of this patent is extended or adjusted under 35 U.S.C. 154(b) by 0 days.

(21) Appl. No.: 10/609,044

(22) Filed: Jun. 27, 2003

(65) Prior Publication Data
US 2004/0096268 A1 May 20, 2004

(30) Foreign Application Priority Data
Jul. 4, 2002 (SE) .............................. 0202113

(51) Int. Cl.⁷ .............................................. F16L 35/00
(52) U.S. Cl. ........................... 285/85; 285/319; 285/81
(58) Field of Search .............................. 285/85, 84, 82, 285/81, 317, 319

(56) References Cited

U.S. PATENT DOCUMENTS

| 1,369,687 | A | * | 2/1921 | Martin | 285/317 |
|---|---|---|---|---|---|
| 2,023,428 | A | * | 12/1935 | Liebhardt | 285/317 |
| 2,097,628 | A | * | 11/1937 | Liebhardt | 285/317 |
| 3,948,548 | A | * | 4/1976 | Voss | 285/321 |
| 4,721,331 | A | * | 1/1988 | Lemelshtrich | 285/319 |
| 4,946,205 | A | * | 8/1990 | Washizu | 285/319 |
| 5,520,151 | A | * | 5/1996 | Gras et al. | 285/319 |
| 5,586,792 | A | * | 12/1996 | Kalahasthy et al. | 285/319 |
| 5,683,117 | A | * | 11/1997 | Corbett et al. | 285/319 |
| 5,941,577 | A | * | 8/1999 | Musellec | 285/317 |
| 6,231,084 | B1 | * | 5/2001 | Hester et al. | 285/81 |
| 6,231,089 | B1 | * | 5/2001 | DeCler et al. | 285/317 |
| 6,354,635 | B1 | * | 3/2002 | Dyson et al. | 285/308 |

* cited by examiner

Primary Examiner—David Bochna
(74) Attorney, Agent, or Firm—Gauthier & Connors LLP

(57) ABSTRACT

A mounting stop at axially displaceable male-female couplings to prevent involuntary release of the coupling, whereby it comprises a recess (2) arranged to be placed in a first position around a shaft (32) and to be displaceable radially sidewise above said shaft (32) to a second position, and that it comprises at least one stop lug (6, 7; 9; 10) arranged, in said first position to be applied into a groove (34) and thereby to prevent an axial displacement of said male-female coupling parts towards each other, as well as a male part (32) present in such a coupling.

11 Claims, 5 Drawing Sheets

MOUNTING STOP

TECHNICAL FIELD

The present invention relates to a mounting stop intended to be used at male-female joints to prevent involuntary release of the joint, and further relates to a male part present in such a joint.

The object of the present invention is to obtain a mounting stop to be used at male-female couplings, in particular quick release couplings for connections of fluids, where, the liquid is set under a high pressure. The mounting stop is arranged to the coupling to prevent involuntary release of the coupling, simultaneously with the demand that it should be able to release to allow a disconnection/disassembly of the coupling.

Another object of the present invention is to obtain a male connector part of such a coupling intended to receive a mounting stop of the use given.

BACKGROUND OF THE INVENTION

It is previously known quick couplings for connecting high pressure lines, i.e., lines which can receive a fluid under a high pressure, such as hydraulic lines in working machines, such as tractors, bucket loaders, digging machines, bulldozers, trucks with tilting facility, forest machines, cranes and the similar, hydraulic driven units of different kinds such as control units onboard ships and aircrafts, breaking fluid lines at heavy vehicles including railroad bound vehicles, towing rolls onboard fishing ships, and many other applications where hydraulic control is suitable and is used. Normally, the hydraulic fluid, oil or water, or other suitable fluid it put under a high pressure, at least 10 kg/cm$^2$, and usually 100–300 kg/cm$^2$.

WO 96/35906 discloses such a quick coupling comprising a female part and a male part, whereby the male part used in said female part comprises a cylindrical part the peripheral surface of which being provided with different grooves, i.a., to receive blocking elements for efficient locking male and female parts together. Male and female parts are released from each other by moving the parts into each other above a locking position, whereby the blocking elements are released from the locking position and male and female parts can be separated from each other. At the mounting/connection of female and male parts the male part is provided with a so called mounting latch arranged to a groove in the male part, which mounting latch prevents the male part from being moved too far into the female part and thereby releasing the blocking elements at the moment of connection. The mounting latch remains in its groove after mounting to prevent the male part from being inadvertently pressed into the female part and thereby being released from this. The mounting latch, which thereby is a security latch, must, however, be eliminated before the release of the coupling, i.e., before male part and female part are to be released from each other, in order to facilitate such release. The mounting latch/security latch according to the above given patent publication is a simple U-latch being snapped over the male part in the groove intended hereto and which latch is maintained by means of the material-elasticity where it closes tight around the shaft in its groove. The latch is provided with a projection containing a recess into which a screwdriver or the similar can be introduced to withdraw or draw out the latch radially from the shaft of the male part. The latch can then easily be lost, which is a problem at maintenance in working environments where spare latches are not easily at hands. The latch is this in no way secured to the coupling and tests made connecting the latch to the male part using a thread/wire has shown that such a wire often will become a hindrance during work, whereby the latch involuntarily will become withdrawn from its fastening position in its groove. Operations in forest environment where a lot of brushwood is present are examples of a high risk for such involuntary release of the latch.

Thus requirements have been raised for a safe mounting stop/mounting latch/stop latch/security latch which can be used in such couplings and which can be readily released from its blocking position to allow a movement of the male-female parts further into each other to release the connecting blocking elements.

SUMMARY OF THE PRESENT INVENTION

It has now turned out possible to solve the problem using a mounting stop at axially movable couplings, by means of the present invention, which means a radially displaceable latch arranged, in a first position around a shaft, to introduce/hold at least one stop lug in a groove to prevent an axial displacement of the parts of the coupling, and in a second position arranged to move said at least one stop lug out off said groove to allow an axial displacement whereby it is further arranged to return to its first position in an automatic way.

DETAILED DESCRIPTION OF THE PRESENT INVENTION

The mounting stop of the present invention is characterized in that it comprises a recess arranged to be placed in a first position around a shaft and to be displaceable radially sidewise above said shaft to a second position, and that it comprises as stop lug arranged, in said first position to be applied into a groove and thereby prevent an axial displacement of said male-female coupling parts towards each other, whereby it further is arranged to return to its first position in an automatic way.

By means of the present invention the mounting stop can be manually moved from a first locking position to a second releasing position, whereupon, if a sidewise pushing pressure ceases the latch will automatically return to its original, locking position around the coupling.

Further characteristics will be evident from the accompanying claims.

In a further embodiment of the invention the recess of the mounting stop on its one side has a diameter corresponding to the diameter of the shaft part over which it is intended to be placed in a first position and wherein the recess of the mounting stop on its other side has a diameter which is less than the diameter of the shaft part over which it is intended to be brought in a second position, whereby the differences in diameters between the recess parts allows for the mounting stop to return to its said first position in an automatic way.

In another preferred embodiment the mounting stop is provided with a slot, whereby this in one embodiment is provided between the lugs shafts of two stop lugs. In another embodiment the slot in arranged on the side of the mounting stop facing said stop lugs.

In another further preferred embodiment the lug units of the stop lugs are arch shaped to said groove corresponding to the radius/periphery of said groove.

In another further preferred embodiment the recess of the mounting stop on its side having a diameter being smaller than the diameter of the shaft part over which it is intended to pass over to a second position, is provided with a radially extending projection.

In a further preferred embodiment the lug units of the stop lugs are provided with a chamfering on its side surface facing a groove.

In another further preferred embodiment the lug units of the stop lugs are provided with a radius on its side surface facing a groove.

A further aspect of the invention encompasses a male part at couplings using male-female coupling parts arranged to be brought together to a tight, dismountable coupling, whereby it comprises at least two peripherally running grooves of which a first groove is intended to receive a mounting stop according to one or more of claims, and a second groove intended to receive at least one stop lug arranged to said mounting stop.

In a preferred embodiment thereof the grooves are separated by means of a projection/flange having a diameter being larger than the diameter of said first groove.

The present invention will now be described in more detail with reference to accompanying drawing showing some exemplifying, non-limiting embodiments of the invention. In the drawing FIG. 1 shows a perspective view of a mounting stop according to the present invention;

FIG. 9 and

Figure 10:
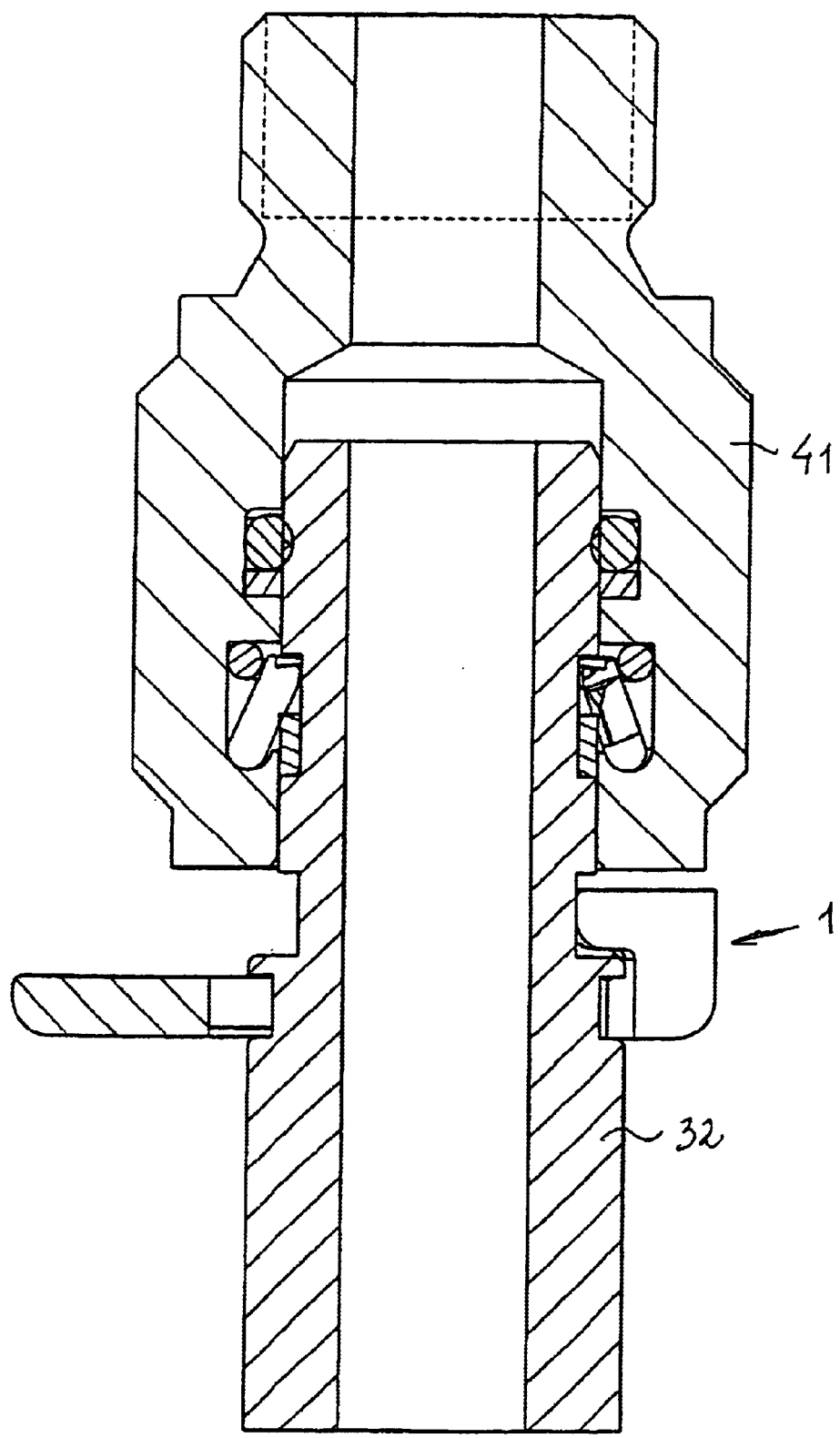

FIG. 10 show the function of the mounting stop according to the invention in a coupling having male-female parts in a cross-sectional view along the longitudinal axis in a released, and blocked position, respectively.

1 denotes in general a latch comprising a substantially oval recess 2. The recess 2 has a first short side 4 having a circular limiting line, which corresponds to a peripheral line 31 of a shaft 32, which peripheral line is the radial boundary of a groove 33. The other short side 5 of the recess 2 has a smaller circular or oval, elliptic limiting line, whereby the long side lines 3 of the recess between these short side lines pass tangentially into each other to obtain two straight long side limiting lines. As the recess 2 at its one side has a smaller diameter than the shaft over which it is intended to be brought peripherally, and with regard to the fact the mounting stop is made of an elastic, flexible material the mounting stop intends to take its position using the larger diameter around the shaft 32. The latch/mounting stop is thus self-centering around its one side.

The mounting stop 1 is either provided with a slot on its first or second short side 4, 5 to allow a mounting of the mounting stop over the shaft 32.

In the embodiment shown, on the first short side 4 of the mounting stop there are two lugs 6, 7 arranged, in the embediment shown, they are provided on each side of a slot 8. The lugs 6, 7 are arranged substantially perpendicular to the main plane of the mounting stop 1 and comprises a lug shaft 9 and a lug unit 10, which is directed in a plane substantially parallel to the main plane of the mounting stop 1. The lug units 10 projects over the side 4 of the recess 2 and are adapted to fall into a groove 34 arranged on the male part. Thereby the lug units 10 have suitably an arch shape to said groove 34 which shape corresponds to the radius/periphery.

The lug units 10 are, in the embodiment shown, manufactured with a recess 13 all the way from the side of the mounting stop 1 facing the side to which the lug units 10 are arranged. Another embodiment lacks this recess 13, but in stead there is a recess between the lug units 10 and the plane of the mounting stop 1, in which plane a projection/flange 35 (discussed more in detail below) may run.

In a preferred embodiment the edge 5 of the recess 2 provided with a radially extending projection 11, which is intended to restrict the sidewise movement of the mounting stop 1. Such a side wise movement can be restricted to such an extent that leads to the lug units 10 being moved out of the groove 34, and allows that male/female parts can be moved together in an intended way.

The male part, the shaft 32, comprises inter alias as mentioned above, two grooves 33 and 34 to which first mentioned groove the mounting stop 1 is intended to be placed, while in the groove 34 the lug units 10 of the mounting stop 1 is intended to be placed into. Between the grooves 33 and 34, the latch groove 33 and the lug unit groove 34, there is a radially extending projection/flange 35 arranged to prevent an axial movement of the mounting stop 1 between the grooves 33 and 34. Thereby the projection/flange 35 has a diameter, which is larger than the diameter of said first mentioned grove (33).

To eliminate the risk that the lug units 10 fasten to the radial projection/flange 35 the lug units 10 are preferably provided with a radius or chamfered edge 36. Hereby the radiuses or chamfered edges 12 and 36 cooperate in such a way that the lug units readily will slide into its groove 34 after a sidewise movement of the mounting stop 1. The groove 33 may, suitably on its side 37 facing the projection 35 be provided with a radius or chamfered edge 38 to allow for a soft and warranted return after a sidewise movement. Such a chamfering may have an angle of 30 to 60° to the main plane of the mounting stop 1, preferably 45°.

In a further embodiment of the invention, the slot 8 has been eliminated whereby the sides 14 and 15 of the mounting stop 1 have been manufactured with a smaller width to allow for the mounting stop 1 being brought over a shaft 32 with is projection/flange 35. This embodiment is more suitable when smaller forces are needed for the movement of a male/female parts towards each other or when there is only a small risk that an involuntary movement will take place.

Figure 1:
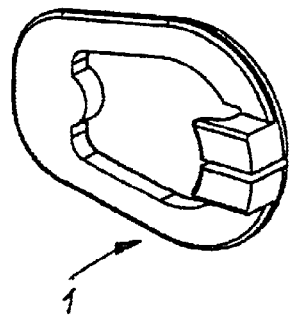
Figure 3:
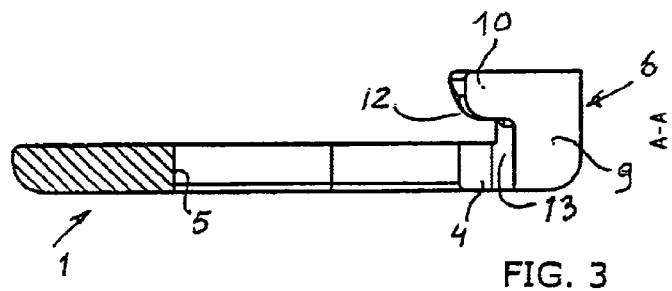
FIG. 3 shows a cross-sectional view of the mounting stop of FIG. 2 in a section along the line A—A of FIG. 2.
Figure 2:
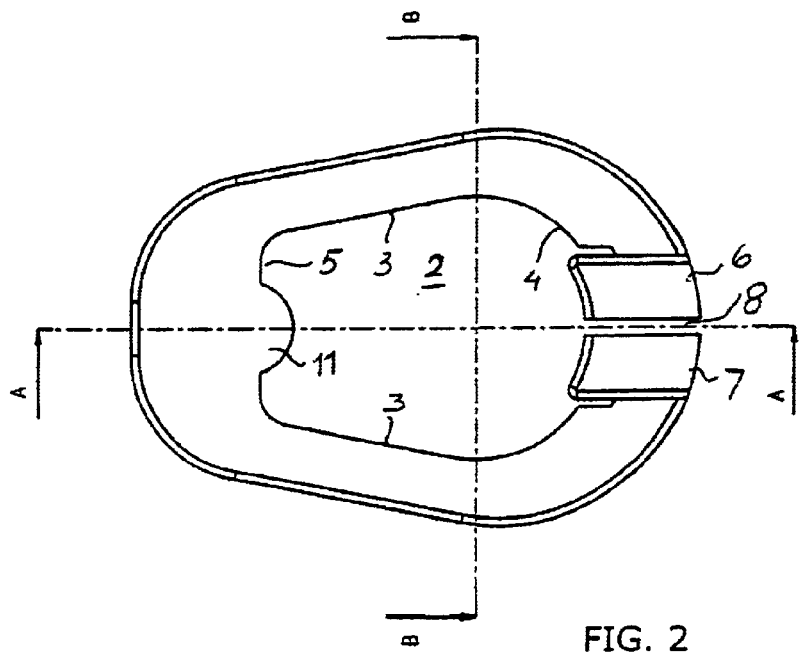
FIG. 2 shows a view from above of the mounting stop of FIG. 1.
Figure 4:
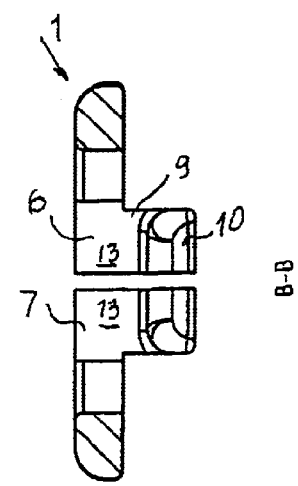
FIG. 4 shows the mounting stop of FIG. 1 in a cross section along line B—B of FIG. 2.
Figure 6:
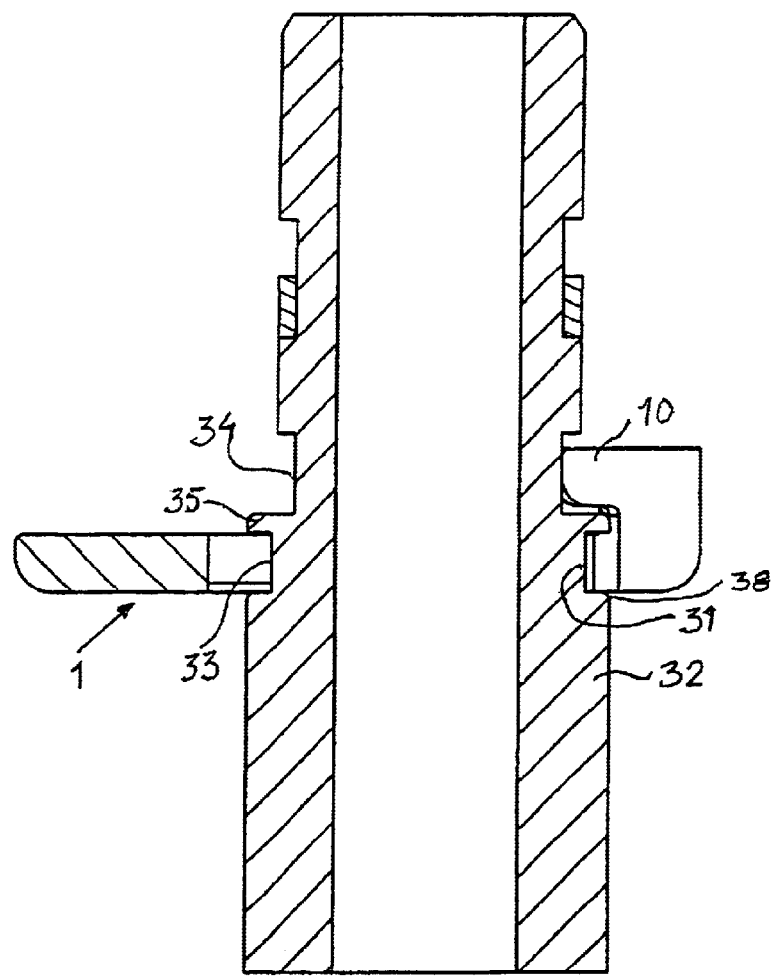
FIG. 6 shows the mounting stop brought onto a shaft according to FIG. 5 seen in a lateral view in a cross-section along the central plane of the shaft.
Figure 5:
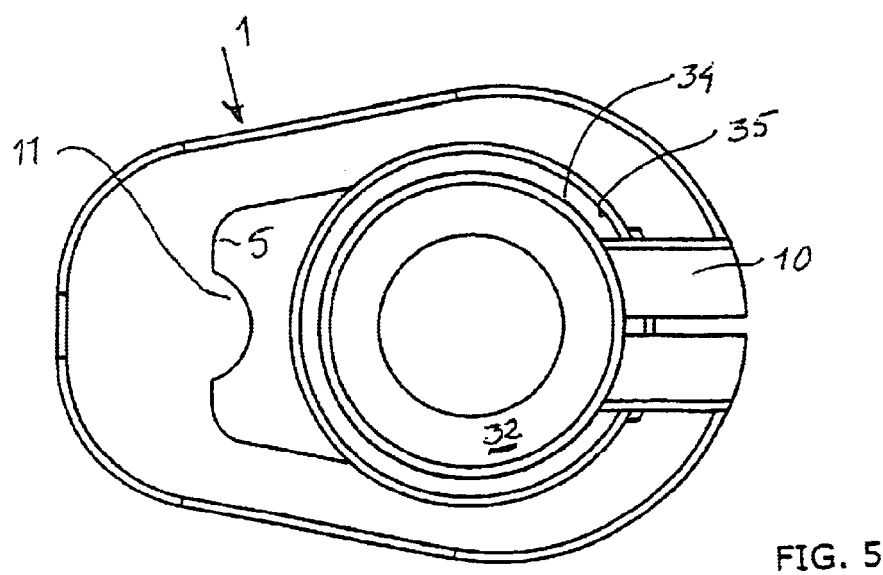
FIG. 5 shows the mounting stop of FIG. 1 brought onto a shaft and being in a first active position, seen from above.
Figure 8:
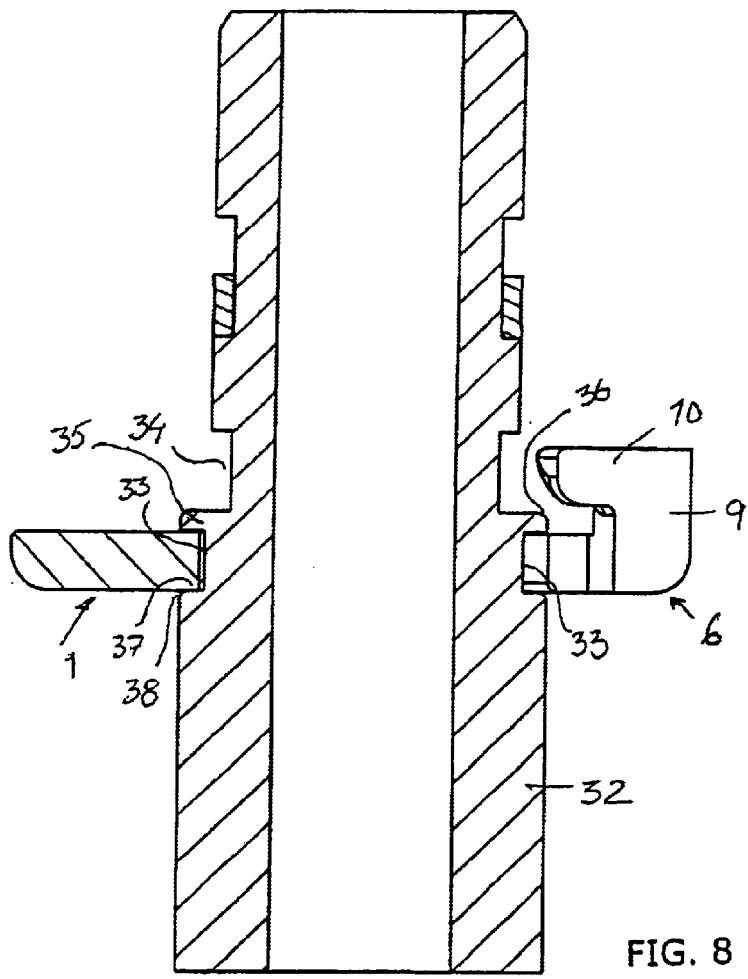
FIG. 8 shows the mounting stop brought onto a shaft according to FIG. 7 seen in a lateral view in a cross-section along the central plane of the shaft.
Figure 7:
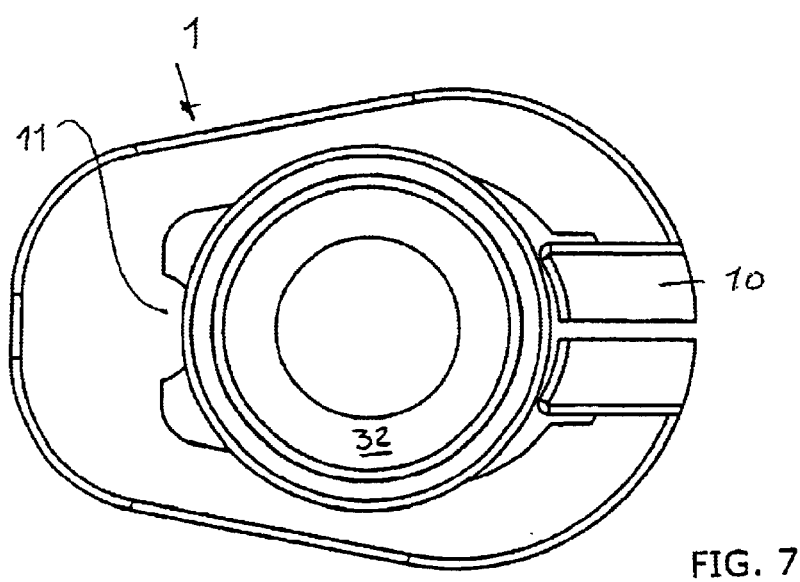
FIG. 7 shows the mounting stop according to FIG. 1 brought onto a shaft and being in a second inactive position seen from above.
Figure 9:
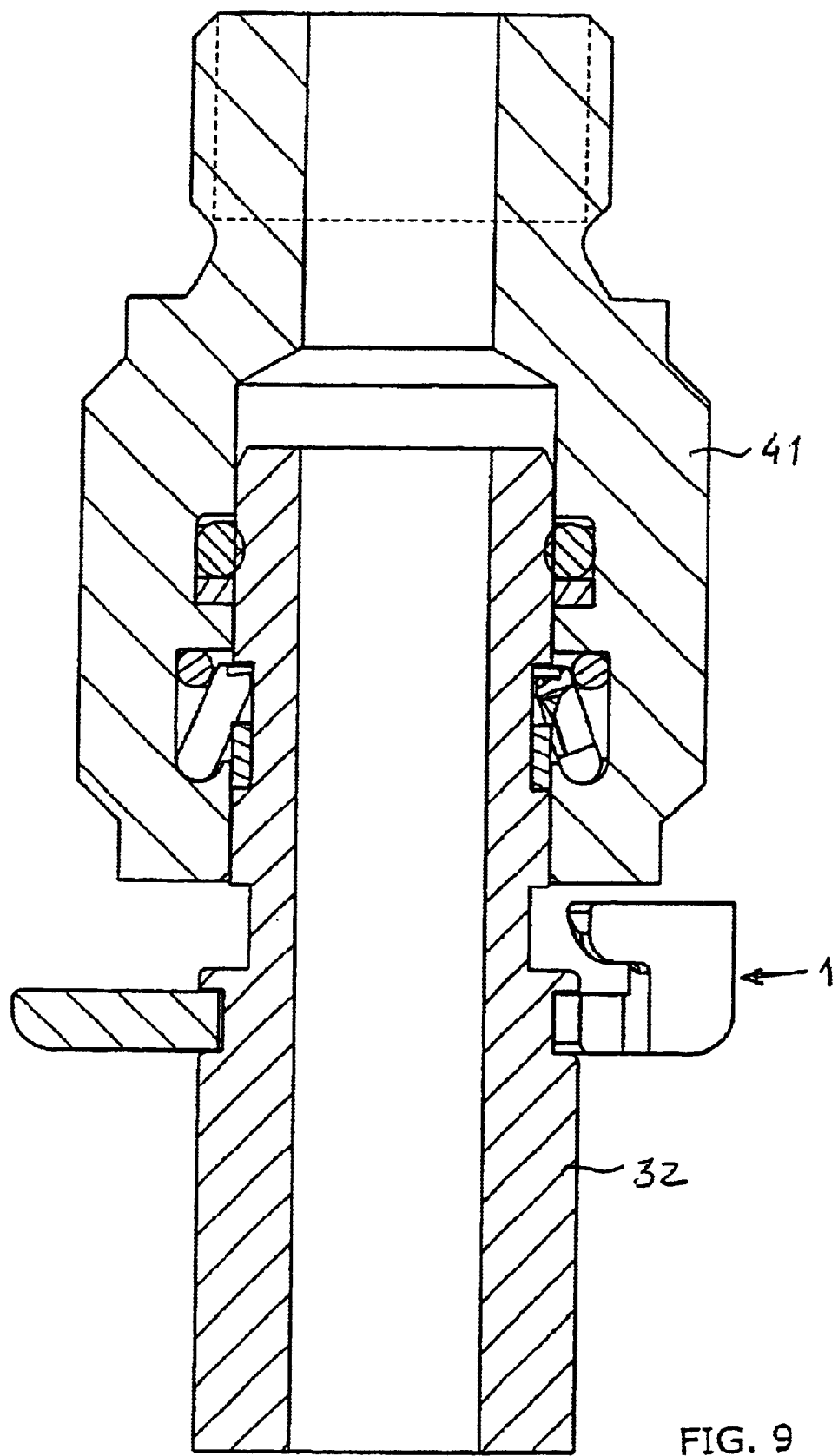

FIG. 9 and FIG. 10 show a combined coupling having a mounting stop 1 according to the present invention, of which it is evident on one hand a female part 41 comprising blocking elements according to the SE patent 9501697-8, on the other hand a male/shaft part 32 according to the present invention, as well as a mounting stop 1. FIG. 9 shows a mounting stop in a sidewise moved position (corresponding to FIGS. 7 and 8) and FIG. 10 shows the mounting stop in a blocking position (corresponding to FIGS. 5 and 6), wherein the blocking lugs 10 engages into the groove 34. SE patent 9501697-8 and the corresponding ones are hereby incorporated as a reference.

What is claimed is:

1. A mounting stop for axially displaceable male-female couplings to prevent involuntary release of the coupling, comprising a recess arranged to be placed in a first position around a shaft and to be displaceable radially sidewise above said shaft to a second position, and at least one stop lug arranged, in said first position to be applied into a groove and thereby to prevent an axial displacement of said male-female coupling parts towards each other, the recess of the mounting stop having on its one side a diameter corresponding to the diameter of a shaft part over which it is intended to be placed in a first position and wherein the recess of the mounting stop on its other side has a diameter which is less than the diameter of the shaft part over which it is intended to be brought in a second position, the differences in diameters between the recess parts allowing for the mounting stop to automatically return to its said first position.

2. A mounting stop according to claim 1, wherein said at least one stop lug comprises at least two stop lugs, each of said stop lugs having a lug shaft, each of said stop lugs being arranged to the mounting stop via its lug shaft.

3. A mounting stop according to claim 2, wherein the mounting stop is provided with a slot.

4. A mounting stop according to claim 3, wherein said slot is arranged between said lugs shafts.

5. A mounting stop according to claim 3, wherein said slot is arranged on the side of the mounting stop facing said stop lugs.

6. A mounting stop according to claim 3, wherein each of said stop lugs further comprise a lug unit said lug units having an arch shape corresponding to a radius/periphery of said groove.

7. A mounting stop according to claim 6, wherein said lug unit is provided with chamfering on its side surface facing said groove.

8. A mounting stop according to claim 6, wherein said lug unit is provided with a radius on its side surface facing said groove.

9. A mounting stop according to claim 1, wherein the recess of the mounting stop on its said other side is provided with a radially extending projection.

10. A male part at couplings using male-female coupling parts arranged to be brought together to a tight, dismountable coupling, comprising at least two peripherally running grooves of which a first groove is intended to receive a mounting stop according to claim 1, and a second groove intended to receive at least one stop lug arranged to said mounting stop.

11. A male part according to claim 10, wherein the grooves are separated by means of a projection/flange having a diameter being larger than the diameter of said first groove.

* * * * *